MAGNETIC TAPE AND FILM REEL

Filed Sept. 7, 1961

JAMES H. JOINER
INVENTOR
BY [signature]
ATTORNEY

United States Patent Office 3,159,358
Patented Dec. 1, 1964

3,159,358

MAGNETIC TAPE AND FILM REEL

James H. Joiner, 1603 Success, Bossier City, La.

Filed Sept. 7, 1961, Ser. No. 136,619
6 Claims. (Cl. 242—74.1)

My invention relates generally to reels for film and magnetic tape and, more particularly, to means incorporated in such reels for engaging the end of such film or tape.

Reels have long been used for handling film, and with the advent and increased use of magnetic recording devices they have found considerable further use as containers for magnetic tape. One problem which is constantly present with the use of reels either for handling film or magnetic tape is providing an effective means for attaching the lead end of the film or tape to the reel so that reeling can begin. For many years, reels had a slot in their hub through which the lead edge of the film or tape was inserted. With this arrangement an attachment between the reel and the film or tape was achieved by making one rotation of the tape about the hub with the lead end of the tape inserted in the slot. The tape was then wrapped upon itself and over the slot so that the lead end was securely held during further reeling. During unreeling, the lead end, which then became the trailing end, would come free easily from the reel when the last wrap was unwound.

The slotted hub reel worked well for many years, and is still in use. It had certain disadvantages however, particularly the inconvenience of threading the lead end of the film into the hub slot. Another problem was that after the lead end was threaded into the slot it was difficult to keep it in place while making the first wrap about the hub. If the hub slot was made narrower, it was easier to keep the lead end in place; however, it was more difficult to thread it. So the slot width in most slotted hub reels was a compromise between these requirements.

Many other attachment arrangements for reels have been developed and used through the years but none has found wide acceptance. The general problem and criteria have remained about the same, and the slotted hub reel is yet to be surpassed in achieving them. What is desired is a quick, easy means for attaching the leading end of a section of tape to a reel hub upon which it is to be rolled and yet having this attachment be automatically releasable when the tape is unrolled.

One of the more recent systems for attaching tape to a reel hub, used primarily since the advent of plastic reels, is a spring mounted pin located adjacent the center of the reel and connected to the hub circumference by a slot. The tape is attached in this arrangement by forming a permanent loop in the end of the tape usually by means of a high strength leader and hooking the leader loop over the pin with the leader extending through the slot and around the hub. This arrangement makes a fine connection between the reel and the tape but does not release when the tape is unrolled.

It is therefore a major object of my invention to provide a reel for film or tape with an attachment mechanism which quickly secures the tape end to the reel hub without threading, and yet is automatically releasable when the tape is unreeled.

It is also an object of my invention to provide such an attachment mechanism which can be easily incorporated into the reel structure.

It is a further object of my invention to provide a reel with an attachment mechanism which quickly engages the leading end of film or tape without the necessity of a leader or loop.

It is still another object of my invention to provide a reel with an attachment mechanism which securely holds a tape end without the risk of damage to it.

It is still a further object of my invention to provide a reel with an attachment mechanism which can be simply and inexpensively manufactured and which is quick and easy to operate.

These and other objects and advantages of my invention will become more readily apparent upon reading the following detailed description, together with the attached drawings, in which.

Figures 1, 2, 3, 4, 5, 6, 7, 8, 9:
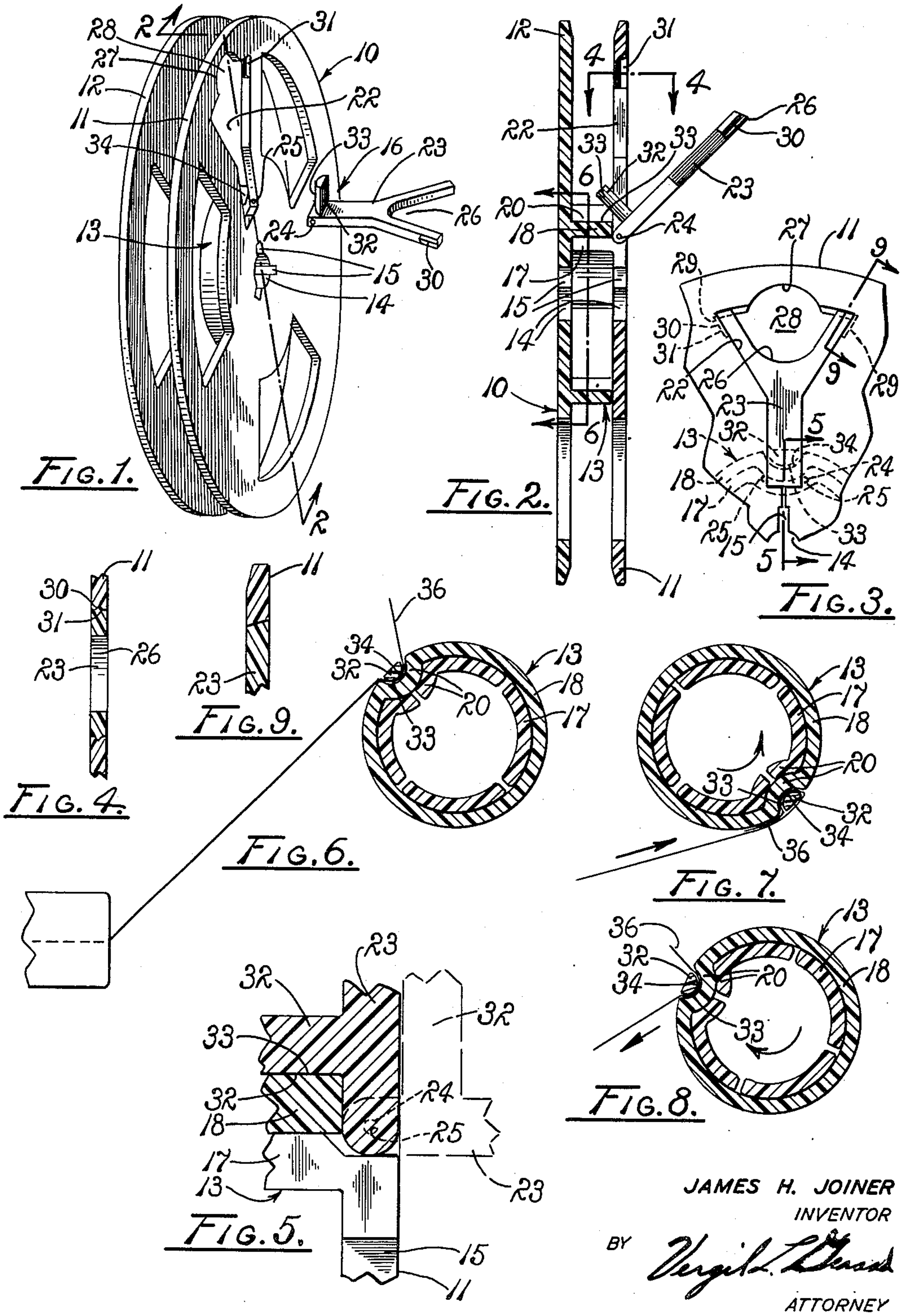
FIGURE 1 is a perspective view of a reel for tape or film incorporating my invention.
FIGURE 2 is a cross-sectional view taken on 2—2 in FIGURE 1.
FIGURE 3 is a partial side view showing my attachment mechanism positioned in the reel.
FIGURE 4 is a partial sectional view taken along the line indicated by 4—4 in FIGURE 2 with the relatively hinged parts moved into alignment with each other.
FIGURE 5 is a partial sectional view taken at 5—5 in FIGURE 3.
FIGURES 6, 7 and 8 are illustrative sectional plan views of the reel hub indicating the modes of attachment and release of a film end in my attachment mechanism, which are taken at the position indicated by 6—6 in FIG. 2 but with reel at different rotational positions.
FIGURE 9 is a partial sectional view taken at 9—9 in FIGURE 3.

Referring now to the drawings and particularly to FIGURE 1 thereof, the numeral 10 designates a reel of the type commonly used for reeling film, magnetic tape and similar materials. Hereafter, I will refer to the reeled material as tape; however, it should be understood that I mean to include film and other reeled materials as well.

My reel consists of two flanges 11 and 12 and a hub 13. The reel also has a mounting bore 14 at its center which is provided with slots 15 which are designed to receive and engage projections on the drive-shaft. Through this engagement power is transmitted from the drive shaft to the reel in a manner well known in the art.

My reel also includes an attachment mechanism 16 by which the tape is secured to the reel hub. This mechanism will be explained in detail later.

As best seen in FIGURE 2, the two flanges 11 and 12 in my reel are each formed with annular hub sections 17 and 18 integral therewith. The hub section 17, formed on flange 11, has an outside diameter which is substantially equal to the inside diameter of the hub section 18, formed on flange 12. Also, the hub section 17 is split at several points about its circumference so that its outside diameter can be reduced slightly, by springing the portions between the splits inward. As a result of this relationship the two hub sections can be fitted snugly together to form a reel with flanges 11 and 12 and a hub 13. The effect of this assembly is shown in FIGURES 6, 7 and 8 as well as in FIGURE 2.

Although the hub sections 17 and 18 are substantially annular, they each have a semi-circular transversely directed indentation or variation 20 formed therein. This indentation 20 appears in both the inner and outer surfaces of the hub sections and prevents relative rotation between them when they are assembled as aforesaid. The indentation 20 also appears in the outer surface of the combined hub 13. Here, the indentation 20 serves as part of the attachment mechanism as will be explained later.

The flanges 11 and 12 both have an axially directed bore 14 at their center, which serves to receive the shaft upon which the reel is mounted, in accordance with the usual reel structure. The flanges 11 and 12 have slots 15 formed in the periphery of the axial opening 14 which extend outwardly therefrom at points spaced 120 degrees apart. As mentioned above, these slots serve to receive projections on the drive shaft and provide a means by which power can be transmitted from the drive shaft to the reel. This is in accordance with usual reel structure.

Although the flanges 11 and 12 are substantially identical, the flange 11 has a special opening 22 which is not present in the flange 12. This opening houses part of my attachment mechanism 16.

The attachment mechanism 16 consists of a Y-shaped arm 23 which is pivotally mounted at its lower end in the opening 22 of flange 11. The mounting is achieved by means of two hemispherical protrusions 24 which are disposed in recesses 25 in flange 11 adjacent the opening 22. To facilitate assembly of the protrusions 24 on arm 23 into the recesses 25, flange 11 is split between the bottom of opening 22 and the bore 14. This structure is shown particularly well in FIGURES 1, 3 and 5. The arm 23 has a semi-circular opening 26 adjacent a similar opening 27 in the upper boundary of opening 22 which together provide a finger hole 28 large enough for insertion of a finger. The finger hole 28 is adapted to permit manual operation of the arm 23 as will be later explained.

Also at the upper end of the arm 23, a locking mechanism 29 is provided which consists of protrusions 30 on each side of the upper end of the arm, and corresponding indentations 31 formed in the flange 11 adjacent the opening 22. By means of this locking mechanism 29 the arm 23 can be closed and locked into the flange 11 flush with its outer surface and can be opened again by inserting a finger in the finger hole 28 and pushing the arm 23 outward so that it pivots about its lower end held by protrusions 24 in recesses 25.

The opening 22 in which the attaching mechanism 16 is mounted is located adjacent the indentation 20. A pin 32 is attached at the lower end of the arm 23, normal to its surface, and extends inwardly from flange 11 when arm 23 is closed into the flange. The pin 32 has a semi-cylindrical surface 33 which is designed to mate with the semi-cylindrical outer surface 34 of indentation 20 and the pin and groove align with each other when the reel is assembled. Pin 32 is so positioned on arm 23 that when arm 23 is closed into flange 11 the surface 33 of pin 32 is juxtaposed the surface 34 of indentation 20 but spaced slightly therefrom to form a gap or slit. This spacing is several times greater than the thickness of the tape to be reeled so that the tape is not actually pressed between the pin surface 33 and the indentation surface 34. See particularly FIGURES 6, 7 and 8 for this relationship.

*Operation*

In operation my reel functions as follows:

Referring particularly to FIGURES 6, 7 and 8, the leading edge 36 of a quantity of film or tape is first extended between the flanges 11 and 12 and laid upon the surface of hub 13 over the top of the indentation 20 after arm 23 of the attachment mechanism 16 has been opened out of flange 11. Arm 23 is then pivoted upwardly about the protrusions 24 at its lower end, until it closes into the opening 22 in flange 11 and projections 30 of locking mechanism 29 engaged with indentations 31. This moves the pin 32 into the indentation 20 capturing the film end 36 between the surfaces 33 and 34. The reel is then rotated in a counter-clockwise direction as viewed in FIGURES 6 and 7. This moves the indentation 20 to a different position on the reel with respect to the source of the tape and causes the tape to double back on itself as shown in FIGURE 7. By this doubling back the tape end 36 locks itself against the outer surface of the hub 13, and as the reel continues to rotate in a counter-clockwise direction the tape end 36 is securely held and the tape is rolled onto the reel.

When it is desirable to remove a roll of tape from my reel the procedure is as follows. The outer end of the tape is connected to the reel to which the tape will be transferred and that reel is driven causing the tape to be unrolled from my reel. This unrolling continues in the usual manner known in the art until the last wrap around hub 13 is reached. At this point the automatic releasing feature of my attachment mechanism begins to perform.

During unreeling the reel will be turning in a clockwise direction as shown in FIGURE 8 and the tape will be moving away from the reel (also as shown in FIGURE 8). As the reel continues around in a clockwise direction releasing the last wrap of tape the indentation 20 will proceed past the point at which it is shown in FIGURE 7 (where the tape end overlaps itself) and will return approximately to the point at which it is shown in FIGURES 6 and 8 (the actual point being determined by the speed and momentum of the reel).

At this point, because of the gap or slit between surface 33 on pin 32 and surface 34 on indentation 20 the tape will be pulled free from the reel. My mechanism therefore automatically releases the tape end 36 upon unrolling of the tape. It will also be noted that this releasing does not require reopening of the attachment mechanism 16.

Although my reel with its incorporated attachment mechanism 16 can be made from many different materials, it is particularly well adapted to plastic molding. A close analysis of the structure of this embodiment of my reel will indicate that it could be formed from three molded parts, flange 11 with its hub section 17 and opening 22, flange 12 with its hub section 18, and arm 23 with its integral pin 32. Quick simple assembly of these parts is also possible.

Understanding the operation of my invention it will now be seen that I have provided a reel to which a tape end can be quickly and securely attached without the necessity of tedious threading or the addition of a loop or leader on the tape end, and from which the tape end can be released automatically without fear of any damage to either the tape or the reel.

Although the particular embodiment herein shown and described is fully capable of obtaining the objects and providing the advantages stated, it is to be understood that this embodiment is merely illustrative of a presently preferred form of my invention, and that I do not mean to limit myself to the details herein shown, other than as defined in the appended claims.

I claim:

1. A reel comprising: a first flange with a first annular hub formed integral therewith, said flange having a shaft opening therein disposed coaxially with said first hub; a semi-cylindrical first hub variation formed in the contour of said first hub; a second flange similar to said first flange with a second hub formed integral therewith, said second flange having a shaft opening therein disposed coaxially with said second hub, and said second hub having an outside diameter substantially equal to the inside diameter of said first hub whereby said hubs can be mated together; a semi-cylindrical second hub variation formed in the contour of said second hub substantially identical to said first hub variation, said variations being disposed to be mated together when said hubs are mated as aforesaid; means defining an elongated opening in one of said flanges extending radially thereof; an arm member shaped to fit said opening and pivotally mounted therein at the end nearest the axis of said flange, said arm member being pivotally movable outwardly from a flush position in said one flange to a position substantially normal thereto; locking means on said arm member for maintaining said arm member in said opening flush with said one flange; means defining a finger hole associated with said arm member for manually engaging and releasing said arm member; a pin formed integral with said arm member at the pivotally mounted end thereof, said pin extending normal to said arm member and axially inward toward the other of said flanges when said arm is locked in said one flange as aforesaid, and said pin being so positioned in said one flange as to align with said variations when said arm is closed in said one flange as aforesaid; and mating surfaces on said outermost variation and said pin, said surfaces defining a gap therebetween of substantially greater width than the thickness of the tape to be reeled when said arm member is locked in said one flange as aforesaid.

2. A reel comprising: a first flange having a first hub section thereon, said first hub section being substantially annular with a first radially inwardly disposed, axially directed semi-cylindrical indentation at one point thereof; a second flange having a second hub section thereon, said second hub section being substantially annular with an outside diameter substantially equal to the inside diameter of said first hub section and having a second radially inwardly disposed, axially directed semi-cylindrical indentation therein, said second indentation being formed to receive said first indentation in mated relationship when said flanges are assembled by telescopic assembly of said hubs and to engage therewith so as to lock said hubs against relative rotation; a pin disposed in said first indentation and having a surface juxtaposed and mated to a surface of said first indentation, said surfaces defining a gap therebetween substantially greater than the thickness of the film handled by said reel; and mounting means mounting said pin in one of said flanges, said mounting means being movable relative to said one flange to remove and replace said pin from said first indentation.

3. A reel comprising: a first flange, having a first hub section thereon, said first hub section having an axially directed cavity thereon; a second flange similar to said first flange, said second flange having a second hub section thereon with an outer surface mated to the inner surface of said first hub section cavity; said hub sections being so disposed on said flanges as to form said reel when said second hub section outer surface is mated with said first hub section cavity inner surface; an axially directed indentation formed in the contour of the outer surface of said first hub section; means defining an opening in one of said flanges; an arm member pivotally mounted in said opening and movable from a position substantially flush with said one flange to a position substantially normal thereto; releasable securing means operatively associated with said arm member and said one flange for normally maintaining said arm member flush with said one flange; a pin on said arm member disposed substantially normal thereto, said pin being so positioned on said arm member as to be directed axially inward therefrom toward the other of said flanges and in alignment with said indentation when said arm member is flush with said flange as aforesaid; and mated surfaces on said indentation and said pin, said surfaces defining a gap therebetween of substantially greater width than the thickness of the tape to be reeled, when said arm member is flush with said one flange as aforesaid.

4. A reel comprising: a first flange with a shaft hole therethrough and a first annular hub thereon, said shaft hole being coaxial with said first hub, and said first hub having an axially directed indentation at one point thereof; a second flange similar to said first flange, said second flange having a second annular hub thereon with a recess substantially similar to said first hub indentation and an outside diameter substantially the same as the inside diameter of said first hub, whereby said flanges are assembled into a reel by telescopic assembly of said hubs and said hubs are locked against relative rotation by engagement of said indentations; a pin disposed in spaced relationship with said first hub section indentation and having a surface juxtaposed the surface of said first hub section indentation, said surfaces defining a gap therebetween of substantially greater width than the thickness of the film handled by said reel; and mounting means mounting said pin in one of said flanges, said mounting means being movable relative to said one flange to remove and replace said pin in said spaced relationship with said first hub section indentation.

5. In a reel having two substantially identical flanges, a hub disposed between said flanges, and a shaft opening disposed axially through said hub, means for attaching a film end to said reel comprising: a pin mount movably mounted on one of said flanges and movable with respect to the outer surface of said hub, from a first position to a second position; and a pin fixedly mounted on said pin mount and disposed coaxially with said hub, between said flanges, and in spaced relationship with the outer surface of said hub to define a gap therebetween substantially greater than the thickness of said film end when said pin mount is in said first position, said pin being displaceable from said normal disposition to an expanded space relationship with the outer surface of said hub when said pin mount is in said second position.

6. In a reel having two substantially identical flanges, a hub disposed between said flanges, and a shaft opening disposed axially through said hub, means for attaching a film end to said reel comprising: an axially disposed indentation formed in the contour of said hub; means defining an opening in one of said flanges; an arm member pivotally mounted in said opening and movable from a position flush with said one flange to a position substantially normal thereto; releasable securing means on said arm member for normally maintaining said arm member flush with said one flange; a pin on said arm member disposed axially inward toward the other of said flanges and in alignment with said indentation when said arm member is flush with said flange; and surfaces on said indentation and said pin, said surfaces defining a gap therebetween of substantially greater width than the thickness of the tape to be reeled when said arm member is flush wih said one flange as aforesaid.

References Cited in the file of this patent

UNITED STATES PATENTS

| | | |
|---|---|---|
| 1,216,967 | Dunavant | Feb. 20, 1917 |
| 1,890,823 | Nuhring | Dec. 13, 1932 |
| 2,778,581 | Lorenz | Jan. 22, 1957 |
| 2,801,811 | Dale | Aug. 6, 1957 |
| 2,859,920 | Flahan | Nov. 11, 1958 |
| 2,969,203 | Mohrlant | Jan. 24, 1961 |

FOREIGN PATENTS

| | | |
|---|---|---|
| 991,991 | France | June 27, 1951 |
| 611,628 | Germany | Apr. 1, 1935 |